(12) United States Patent
Davis et al.

(10) Patent No.: US 7,468,083 B2
(45) Date of Patent: Dec. 23, 2008

(54) VACUUM CLEANER EQUIPPED WITH BAG MOUNT AND SEPARATE BAG CADDY

(75) Inventors: Ronald E. Davis, Danville, KY (US); James T. Crouch, Danville, KY (US); Chad D. Overvaag, Danville, KY (US)

(73) Assignee: Panasonic Corporation of North America, Secaucus, NJ (US)

( * ) Notice: Subject to any disclaimer, the term of this patent is extended or adjusted under 35 U.S.C. 154(b) by 707 days.

(21) Appl. No.: 10/980,442

(22) Filed: Nov. 3, 2004

(65) Prior Publication Data
US 2005/0098039 A1    May 12, 2005

Related U.S. Application Data

(60) Provisional application No. 60/518,394, filed on Nov. 7, 2003.

(51) Int. Cl.
*B01D 46/02* (2006.01)
(52) U.S. Cl. .............. 55/362; 55/361; 55/367; 55/369; 55/373; 55/377; 55/378; 55/DIG. 2; 15/347; 15/350; 15/351; 15/352; 15/353
(58) Field of Classification Search .......... 55/374, 55/376, 377, 378, 382, DIG. 2, 362, 361, 55/367, 369, 373; 15/347, 350, 351, DIG. 8, 15/352, 353
See application file for complete search history.

(56) References Cited

U.S. PATENT DOCUMENTS

| | | | |
|---|---|---|---|
| 2,596,808 A | | 5/1952 | Lofgren |
| 3,238,706 A | * | 3/1966 | Kurlinski ............ 55/374 |
| 3,375,541 A | * | 4/1968 | Fromknecht ......... 15/327.2 |
| 4,452,618 A | | 6/1984 | Kuplas |
| 4,591,369 A | * | 5/1986 | Stewart et al. ......... 55/374 |
| 4,738,697 A | * | 4/1988 | Westergren ............ 55/376 |
| 4,748,713 A | | 6/1988 | Sepke et al. |
| 4,885,013 A | | 12/1989 | Ahlf et al. |
| 4,921,606 A | | 5/1990 | Goldman |
| 4,961,765 A | | 10/1990 | Guhne et al. |
| 5,028,245 A | | 7/1991 | Stein et al. |
| 5,092,915 A | | 3/1992 | Lackner |
| 5,134,751 A | | 8/1992 | Reed |
| 5,226,941 A | | 7/1993 | Uibel |
| 5,246,581 A | | 9/1993 | Goldman |
| 5,468,272 A | | 11/1995 | Schmierer |
| 5,472,465 A | | 12/1995 | Schmierer |
| 5,766,283 A | | 6/1998 | Bumb et al. |
| 5,935,280 A | * | 8/1999 | Lee ..................... 55/378 |
| 6,086,649 A | * | 7/2000 | Tuvin et al. ............ 55/367 |

(Continued)

FOREIGN PATENT DOCUMENTS

CA    964411    3/1975

(Continued)

*Primary Examiner*—Duane Smith
*Assistant Examiner*—Minh-Chau T. Pham
(74) *Attorney, Agent, or Firm*—King & Schickli, PLLC (57) ABSTRACT

A vacuum cleaner includes a housing having a filter bag cavity. A suction generator and a bag mount are both carried on the housing. Additionally, the vacuum cleaner includes a bag caddy that is displaceable between an operating position connected to the bag mount and a bag disposal position disconnected from the bag mount.

32 Claims, 13 Drawing Sheets

U.S. PATENT DOCUMENTS

| | | |
|---|---|---|
| 6,256,834 B1 | 7/2001 | Meijer et al. |
| 6,261,331 B1 | 7/2001 | Fleurier et al. |
| RE38,842 E * | 10/2005 | Fish et al. .................... 55/374 |
| 7,024,724 B2 * | 4/2006 | Ponjican et al. ............... 15/347 |
| 7,310,854 B2 * | 12/2007 | Nam et al. .................... 15/347 |
| 7,325,272 B2 * | 2/2008 | Bosses ...................... 15/327.2 |

FOREIGN PATENT DOCUMENTS

| | | | |
|---|---|---|---|
| DE | 2 309 932 | 9/1973 | |
| DE | 2 407 478 | 8/1974 | |
| DE | 23 48 879 | 4/1975 | |
| DE | 10014832 | 1/1998 | |
| GB | 2001 550 A | 2/1979 | |
| SE | 8303921-4 * | 1/1984 | .................. 55/367 |

* cited by examiner

VACUUM CLEANER EQUIPPED WITH BAG MOUNT AND SEPARATE BAG CADDY

This application claims the benefit of U.S. Provisional Patent Application Ser. No. 60/518,394 filed on Nov. 7, 2003.

TECHNICAL FIELD

The present invention relates generally to the floor care equipment field and, more particularly, to a vacuum cleaner equipped with a bag mount and separate bag caddy.

BACKGROUND OF THE INVENTION

Vacuum cleaners incorporating a filter bag for separating dirt and debris from an air stream drawn into a vacuum cleaner are well known in the art. Such systems have been utilized for canister, upright and hand-held vacuum cleaners.

U.S. Pat. No. 4,591,369 to Stewart, Sr. et al. discloses a canister vacuum cleaner equipped with a bag mount that is pivotally connected to the canister housing and holds a bag in a cavity in that housing. The bag mount includes a plate-like body member including a suction inlet opening and carries a bag receiver including cooperating opposed channels. The bag mount also includes opposed pivot posts for pivotally connecting the bag mount to the canister vacuum cleaner housing.

While the bag mount of the Stewart, Sr. et al. patent very efficiently and effectively holds a filter bag in the vacuum cleaner, it must be appreciated that the operator must actually handle and touch the dirty bag when removing a used bag from the bag mount. The present invention represents a significant advance in the art in that it allows the used bag to be removed and changed without the vacuum cleaner operator actually having to physically touch the bag.

SUMMARY OF THE INVENTION

In accordance with the purposes of the present invention as described herein, a vacuum cleaner is provided. That vacuum cleaner includes a housing. Both a suction generator and a bag mount are carried by the housing. Additionally, a bag caddy is displaceable between an operating position connected to the bag mount and a bag disposal position disconnected from the bag mount.

More specifically describing the invention, the bag mount is pivotally connected to the housing. The bag mount includes a body having a bag inlet. A first seal is provided on the body around the bag inlet. A reinforcing rim is provided on the body around at least a portion of the first seal. Additionally, the bag mount includes a bag receiver. In one possible embodiment the bag receiver comprises a pair of opposed bag collar receiving channels.

The bag caddy includes a body and a handle. Additionally, the bag caddy includes a bag inlet, a bag retainer, a bag ejector and a connector for securing the bag caddy on the bag mount. A first seal is provided on a first face of the bag caddy around the inlet. Additionally, a second seal is provided on a second face of the bag caddy around the inlet.

The bag retainer may take the form of a securing pin. The securing pin is displaceable between a bag retaining position and a bag releasing position. The securing pin is held in a latch housing and a spring in the latch housing biases the pin into the releasing position.

The bag ejector slides relative to the body of the bag caddy between a bag latching position and a bag ejecting position. The bag ejector includes at least one control tab. That control tab engages the securing pin and displaces the securing pin into the bag retaining position against the biasing force of the spring when the bag ejector is in the bag latching position.

Still more specifically describing the invention, the body of the bag caddy includes a pair of guide slots and the bag ejector includes a pair of followers. One of the followers is received in each of the guide slots. Further, the bag ejector includes an actuator that extends between the pair of followers. Additionally, each one of the followers includes a lug.

The filter bag includes a bag collar including a central projection, a securing aperture, an inlet port, side margins and a leading edge. When properly seated on the bag caddy, the side margins of the bag collar are received in the opposed bag collar receiving channels and the retaining pin is received in the securing aperture. Further, the leading edge butts against the two lugs on the followers. A connector in the form of opposed cooperating channels allows one to connect the bag caddy to the bag mount.

A used bag may be removed from the bag mount on the vacuum cleaner housing by grasping the handle of the bag caddy and sliding the bag caddy from the bag mount. The used filter bag may then be removed from the bag caddy by engaging the actuator of the ejector and sliding the ejector to the bag ejecting position. As this is done the lugs engage the leading edge of the mounting collar and strip the mounting collar and filter bag from the bag caddy. Advantageously, in this way it is possible to remove and discard a used filter bag from a vacuum cleaner without having to actually physically touch the dirty bag.

In accordance with yet another aspect of the present invention, a method is provided for making a filter bag changing system for a vacuum cleaner. The method comprises the steps of providing a bag mount on a housing of the vacuum cleaner and providing a bag caddy for (a) holding the filter bag and (b) connecting and disconnecting from the bag mount. The method may be further described as including the providing of the bag caddy with a bag ejector for removing a used bag from the bag caddy.

In the following description there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain certain principles of the invention. In the drawing:

FIG. 4b is a longitudinal cross sectional view of the structure illustrated in FIG. 4a;

FIG. 4c is a transverse cross sectional view of the structure illustrated in FIG. 4a;

Reference will now be made in detail to the present preferred embodiment of the invention, an example of which is illustrated in the accompanying drawings.

DETAILED DESCRIPTION OF THE INVENTION

Figure 1:
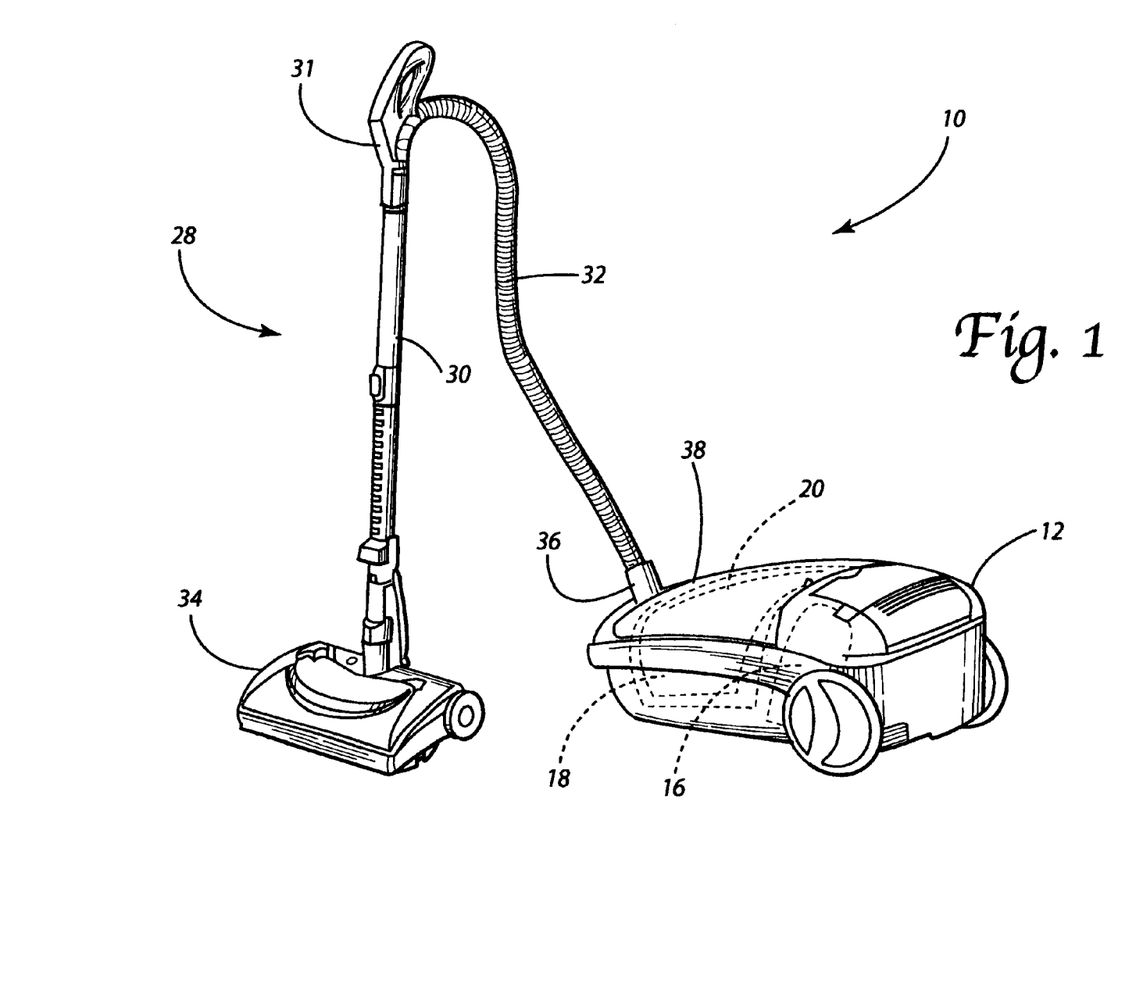
FIG. 1 is a perspective view of a canister vacuum cleaner.
Figure 2A:
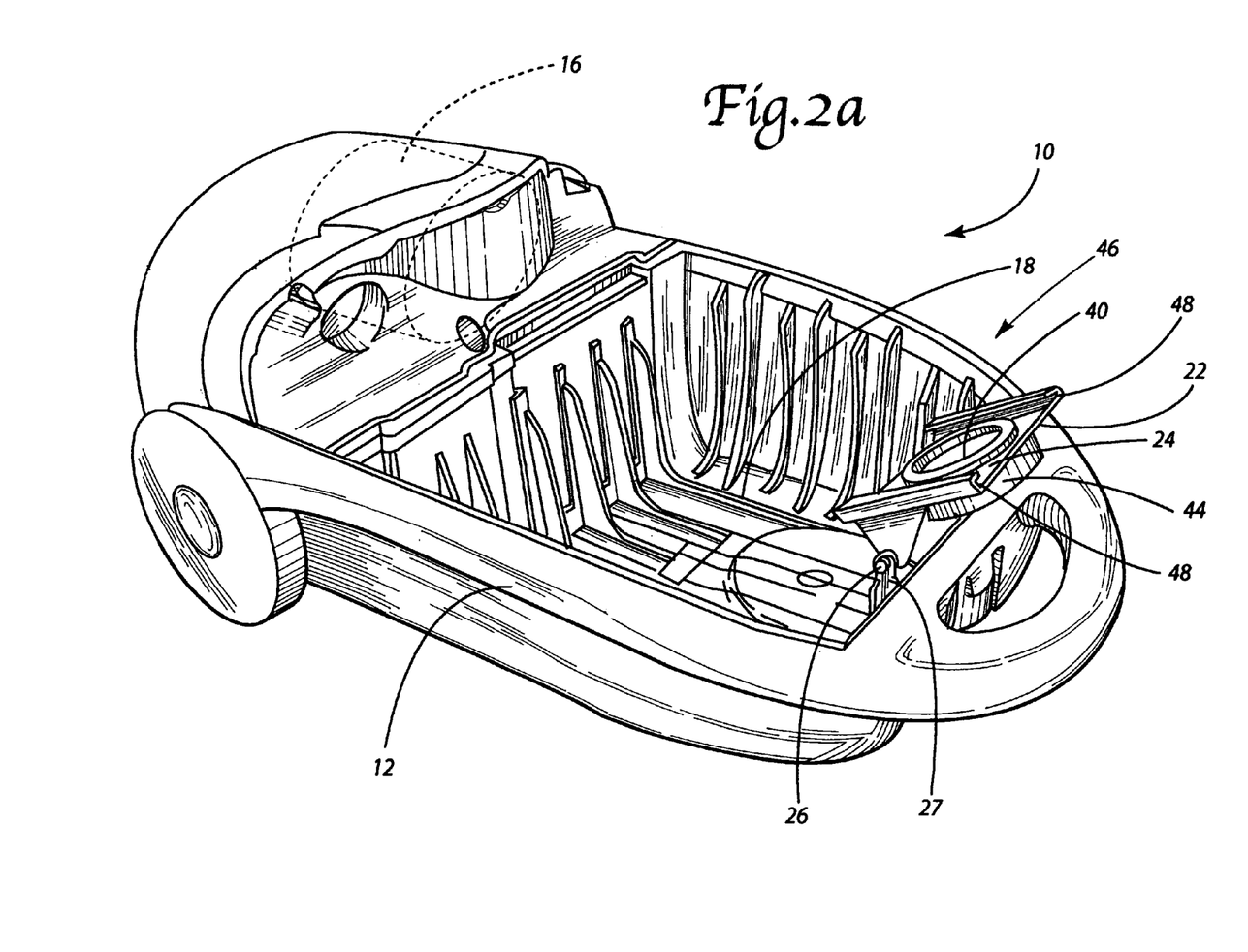
FIG. 2a is a perspective view of the housing of a canister vacuum cleaner of the present invention with the filter bag access door removed to show the filter bag cavity and bag mount.
Figure 2B:
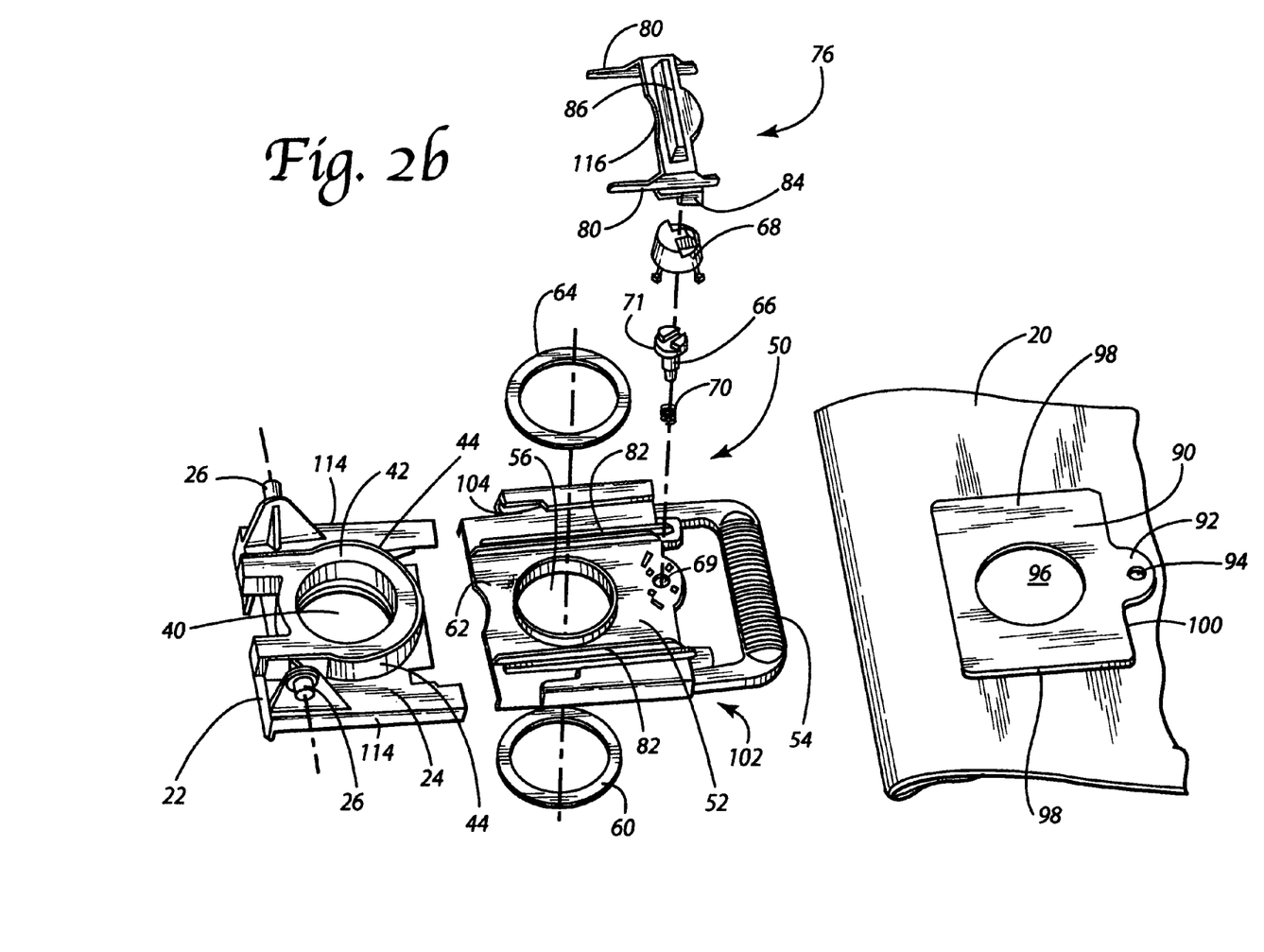
FIG. 2b is an exploded top perspective view of the bag mount, bag caddy and a filter bag.

Reference is now made to FIGS. 1, 2a and 2b showing the vacuum cleaner 10 of the present invention. The vacuum cleaner 10 includes a canister housing 12 that has an internal motor compartment for housing a suction generator 16 in the form of a fan and motor assembly. The canister housing 12 also includes a cavity 18 for receiving and holding a dust or filter bag 20 on a bag mount 22. The bag mount 22 includes a body 24 including a pair of pivot posts 26 for pivotally mounting the bag mount 22 in cooperating apertures in the walls 27 of the canister housing 12.

Of course, the vacuum cleaner 10 also includes a wand assembly, generally designated by reference numeral 28. The wand assembly 28 includes a two section, telescoping wand 30, a control handle 31 and a cooperating flexible hose 32. The cleaning end of the wand 30 is connected to a powerhead 34 or other appropriate cleaning attachment. The free end of the hose 32 includes a hose connector 36 for connection in an inlet port provided in the bag cavity access door 38.

The end of the hose connector 36 is provided in fluid communication with a bag inlet 40 provided in the bag mount 22. A seal 42 carried on the body 24 of the bag mount 22 engages the end of the hose connector 36 so that dirt and debris may be drawn efficiently through the powerhead 34, wand 30, hose 32 and hose connector 36 through the inlet 40 into the dust bag 20 by the suction generator 16.

As illustrated, the bag mount 22 also includes a reinforcing rim 44 on the body 24 around at least a portion of the seal 42. Further, the bag mount 22 may include a bag receiver 46 on the body 24 (see FIG. 2a). As illustrated, the bag receiver 46 comprises two cooperating opposed channels 48. As will be described in greater detail below, the bag receiver 46 and these channels 48 allow one to directly connect a dust bag 20 to the bag mount 22 if desired for some reason by the vacuum cleaner operator.

Figure 3A:
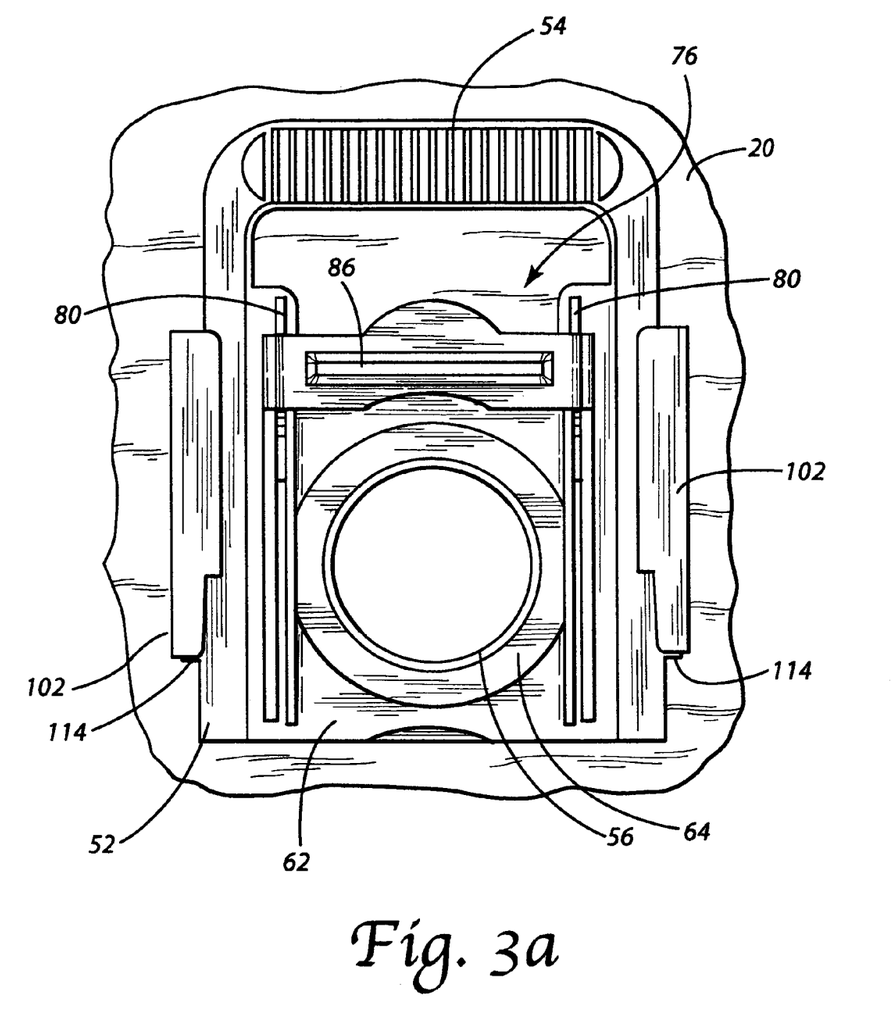
FIG. 3a is a top plan view of the bag caddy holding the collar of a filter bag.
Figure 3B:
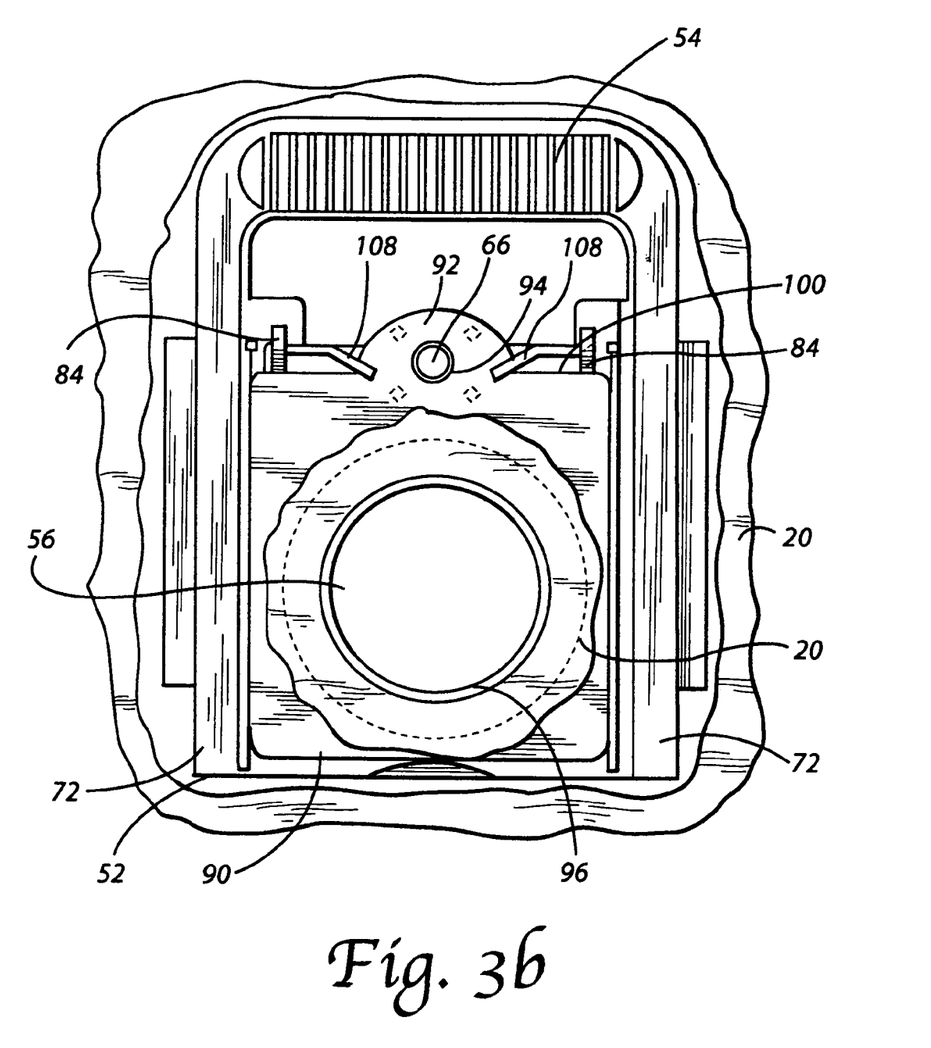
FIG. 3b is a bottom plan view of the structure shown in FIG. 3a with the bag cut away for clarity.

As best illustrated in FIGS. 2b, 3a and 3b, the bag caddy, generally designated by reference numeral 50, includes a body 52 and a handle 54. An inlet 56 is provided in the body. The body 52 includes a first face 58 carrying a first seal 60 about the inlet 56 and a second face 62 carrying a second seal 64 also about the inlet 56 (see also FIG. 4c).

The bag caddy 50 also includes a bag retainer in the form of a securing pin 66. The securing pin 66 is held in a latch housing 68 and projects through an aperture 69 in the body 52. A spring 70 is concentrically received around a portion of the securing pin 66. The compression spring 70 extends between the second face 62 of the body 52 and the head 71 of the securing pin. The bag caddy 50 also includes a bag receiver, generally designated by 72. The bag receiver comprises a pair of opposed cooperating channels 74 (see FIGS. 2c and 4c). Together, the securing pin 66 and the bag receiver 72 function in a manner that will be described in greater detail below to secure a dust bag 20 to the bag caddy 50.

The bag caddy 50 also includes a bag ejector, generally designated by reference numeral 76. The bag ejector 76 includes at least one control tab 78 for engaging the head 71 of the securing pin 66 through openings in the latch housing 68 and a pair of spaced followers 80 that are received in a pair of guide slots 82 provided in the body 52 (see FIGS. 2b, 3a, 3b, 4a, 4b, 4c and 5c). A lug 84 is provided on the end of each follower 80. The bag ejector 76 also includes an actuator 86 that extends between the two followers 80.

As also illustrated in FIGS. 2a and 2b, the dust bag 20 includes a bag collar 90 formed from cardboard, plastic or other appropriate material. The bag collar 90 includes a central projection 92 including a securing aperture 94. Additionally, the bag collar 90 includes an inlet port 96, opposing side margins 98 and a leading edge 100. The dust bag 20 is connected by adhesive or other appropriate means to the bag collar 90. An inlet in the wall of the dust bag 20 is connected over and aligned with the inlet port 96 in the bag collar 90. It is the bag collar 90 that allows connection of the dust bag 20 to the bag caddy 50.

Figure 4A:
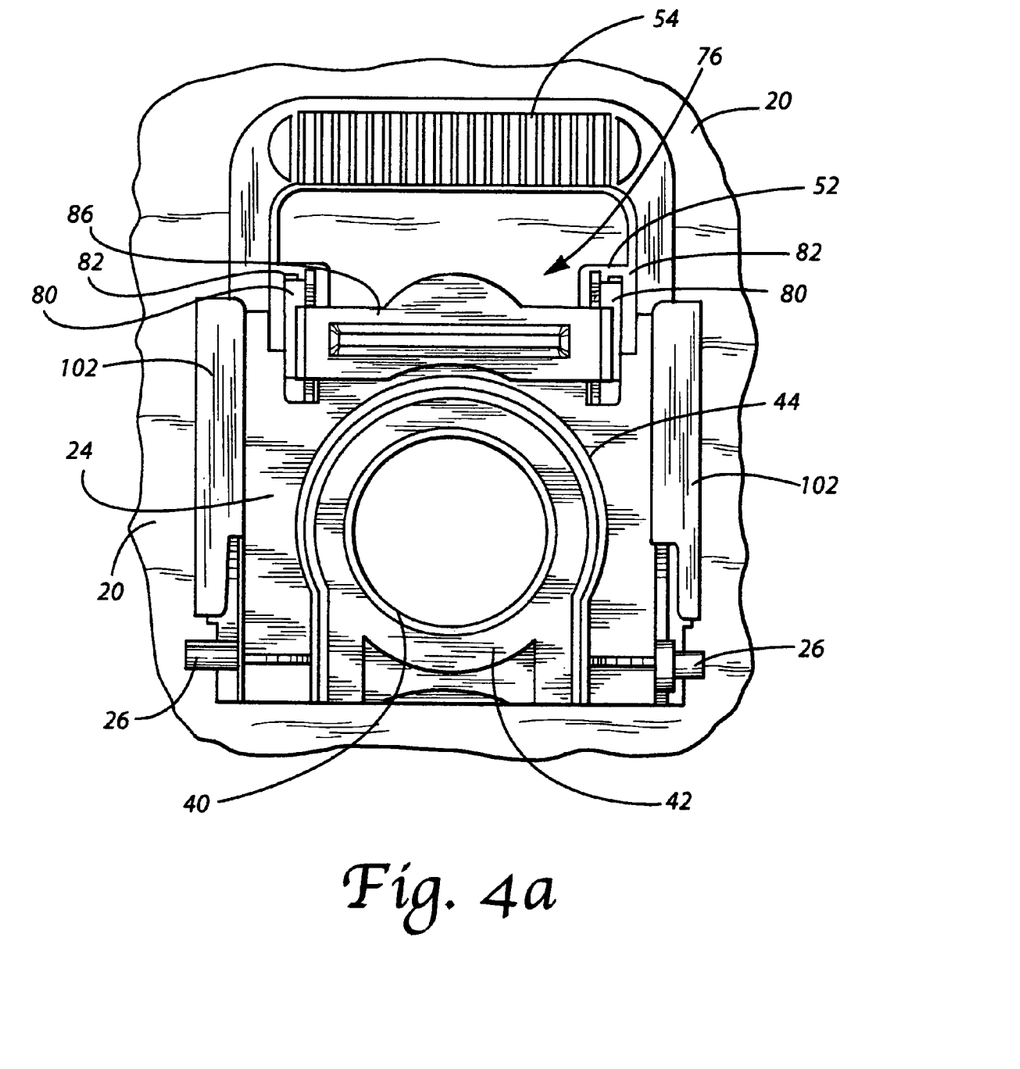
FIG. 4a is a top plan view showing the structure of FIGS. 3a and 3b mounted on the bag mount.
Figure 4B:
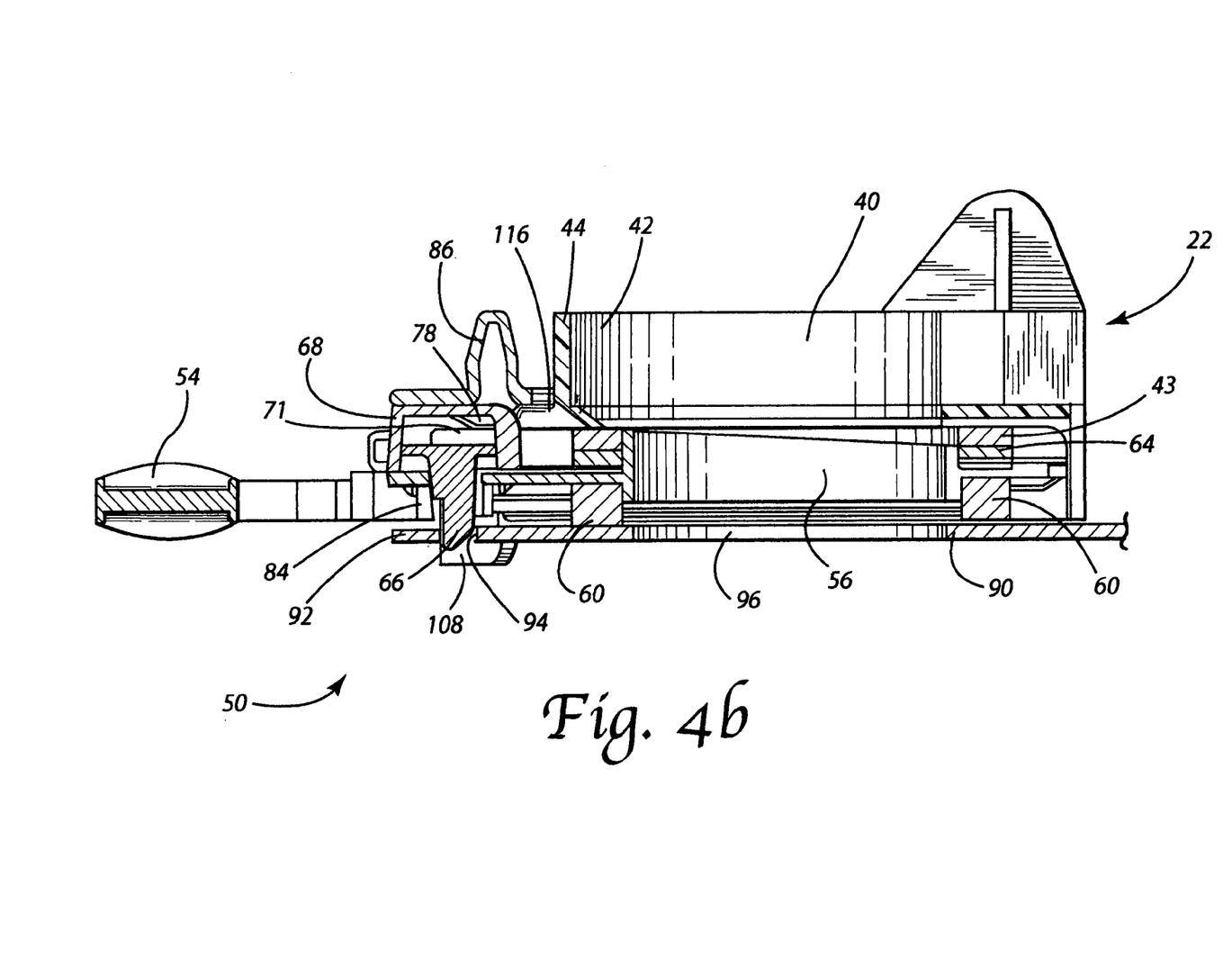
Figure 4C:
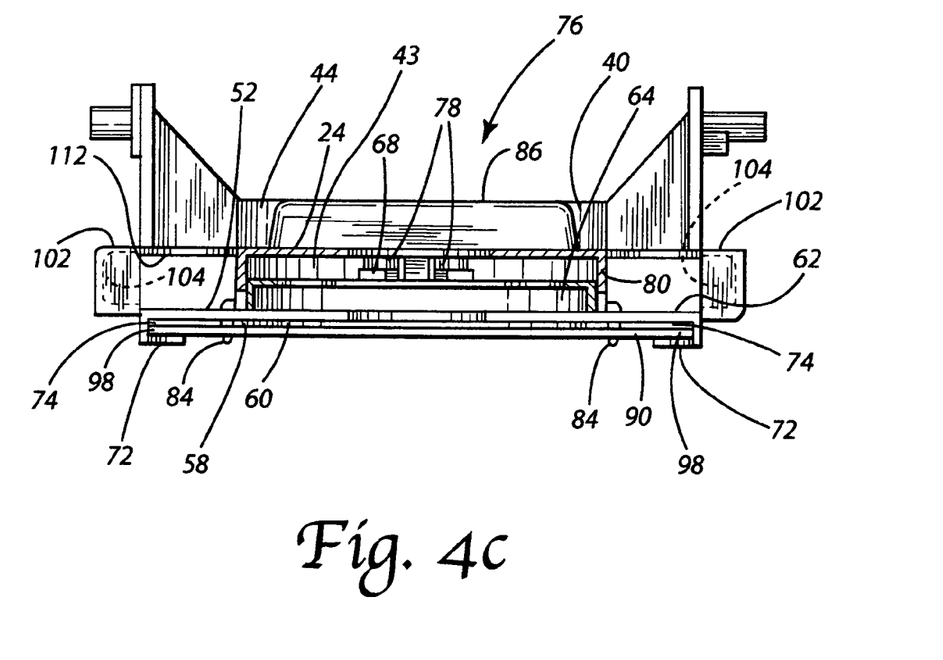

More specifically, the bag 20 is connected to the bag caddy 50 by aligning the bag collar 90 along the first face 58 of the body 52 of the bag caddy 50 (see FIGS. 2b and 4c). The operator then slides the bag collar 90 relative to the bag caddy 50 so that the side margins 98 are inserted in the two opposed channels 74 of the bag receiver 72.

Figure 5A:
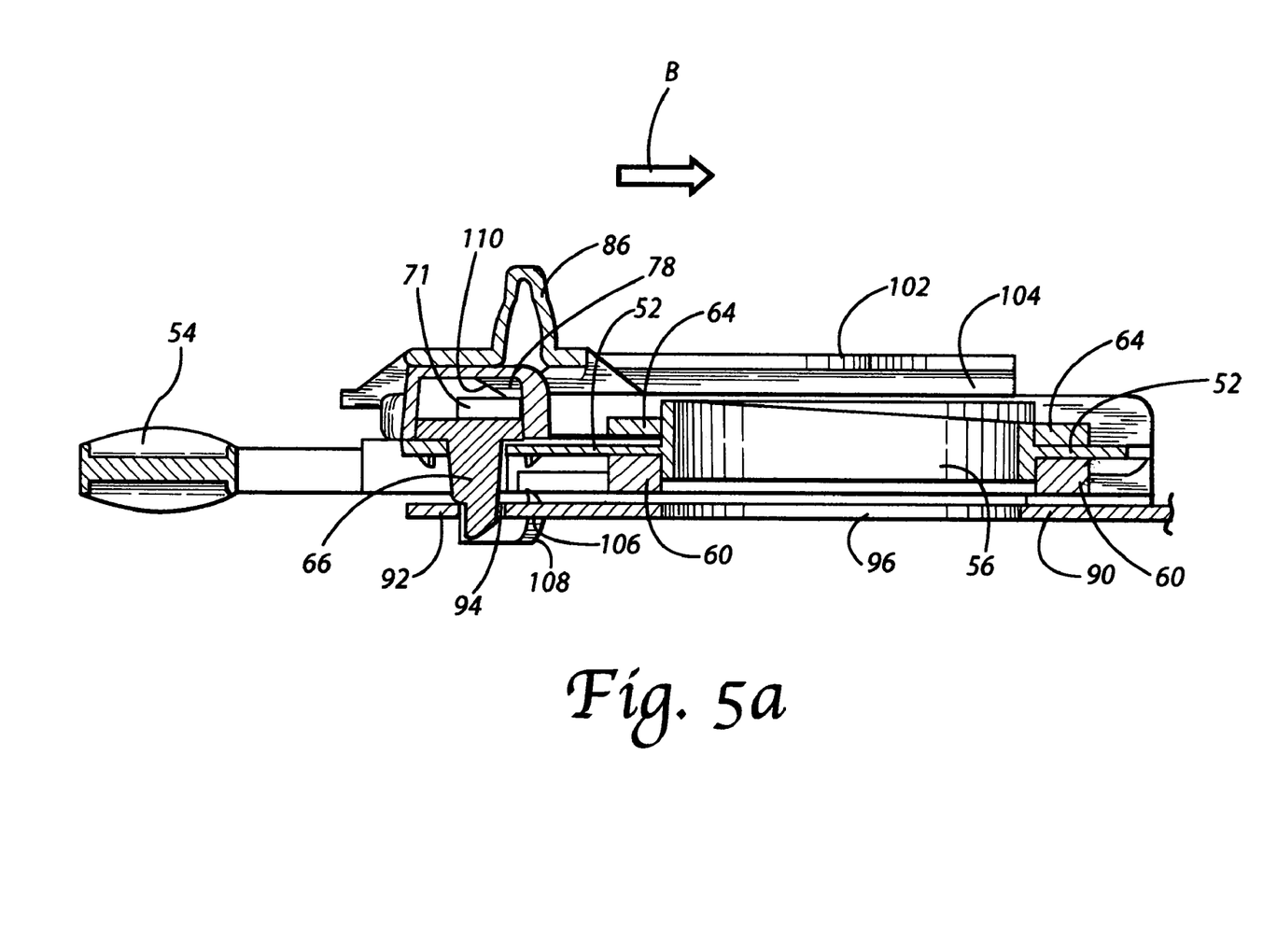
FIGS. 5a-5c are a serial depiction in cross sectional view of the stripping of a filter bag from the bag caddy.
Figure 5B:
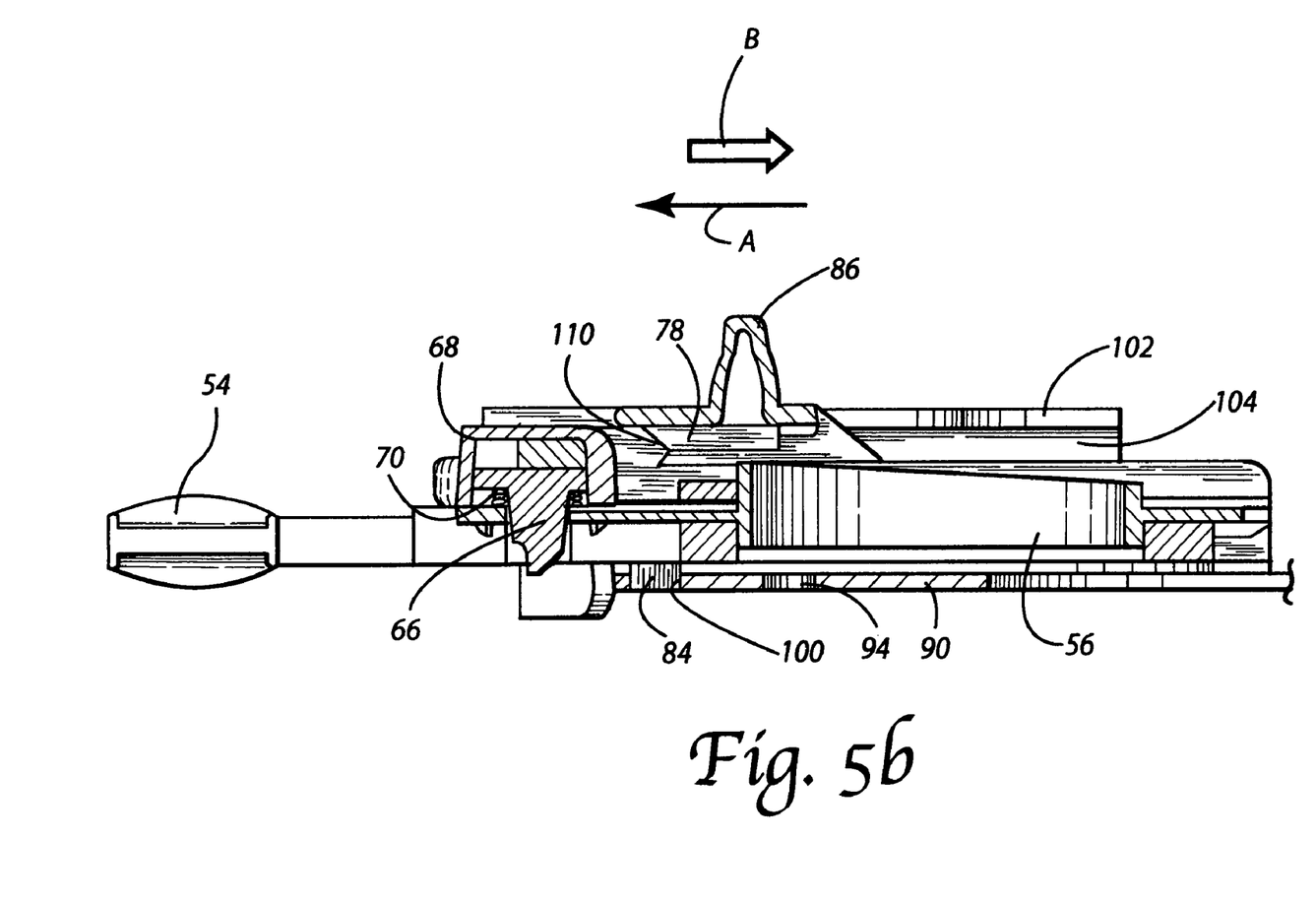
Figure 5C:
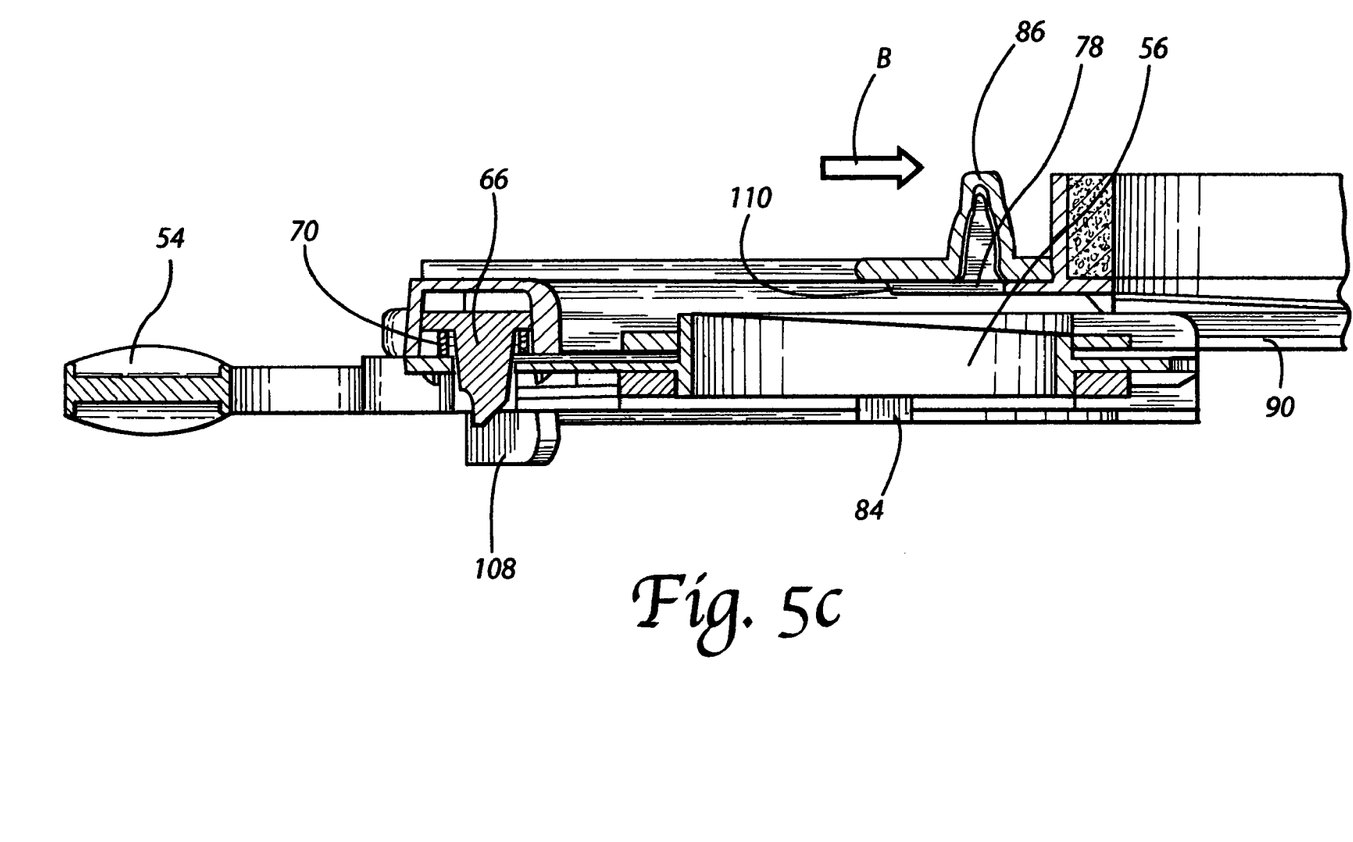

As the bag collar 90 slides into place, the leading edge 100 of the bag collar engages the lugs 84 thereby displacing the ejector 76 relative to the bag caddy 50 in the direction of action arrow A (see FIG. 5b). Once the bag collar 90 is fully seated on the bag caddy 50, the central projection 92 is received in the slots 106 formed by the tabs 108 and the securing pin 66 is aligned with and received in the securing aperture 94 in the bag collar 90 (see FIG. 5a).

As the leading edge 100 of the bag collar 90 drives the bag ejector 76 into the latching position illustrated in FIG. 5a, it should be appreciated that the control tab 78 on the ejector engages the head 71 of the securing pin 66. A sloped cam surface 110 on the tab 78 functions to gradually displace the pin 66 against the biasing force of the spring 70 so that the pin 66 projects through the securing aperture 94.

With the side margins 98 snugly received in the channels 74 (see FIG. 4c), the securing pin 66 projecting into and through the securing aperture 94 in the bag collar 90 (see FIG. 5a) and the tabs 108 received over the central projection 92 of the bag collar 90 adjacent the securing aperture 94 (again see FIG. 5a), it should be appreciated that the dust bag 20 is securely connected to the bag caddy 50.

The bag caddy 50 may then be easily connected to the bag mount 22. More specifically, the bag caddy 50 may be carried by the handle 54. The second face 62 of the bag caddy 50 is then aligned with a first face 112 of the bag mount 22 (see FIG. 4c). This aligns the cooperating channels 104 of the connector 102 on the bag caddy 50 with the margins 114 of the bag mount defining the side edges thereof (see also FIG. 2b). The operator then slides the bag caddy 50 down over the bag mount 22 so that those margins 114 are received in the cooperating channels 104. When the bag caddy 50 is fully seated on the bag mount 22, the reinforcing rim 44 engages the notch 116 in the actuator 86 of the bag ejector 76 thereby further securing the securing pin 66 in the projected position through the securing aperture 94 of the bag collar 90 (see FIGS. 2b and 4b). Simultaneously, the inlet port 96 in the bag collar 90 is aligned with the inlet 56 in the bag caddy 50. The first seal 60 completes a substantially airtight connection between the bag caddy 50 and the bag collar 90. Additionally, it should be appreciated that the inlet 56 in the bag caddy 50 is aligned with the inlet 40 in the bag mount 22. The second seal 64 on the second face 62 of the bag caddy 50 seals that connection by engaging a cooperating seal 43 on the bag mount 22.

After a certain operating time, the filter bag 20 will fill with dirt and debris and it will become necessary to change the filter bag. This may be easily accomplished and the operator does not even have to physically touch the dirty filter bag 20. More specifically, the operator opens the access door 39 on the canister housing 12 so as to expose the cavity 18 and the filter bag 20. Next the operator grasps the handle 54 of the bag caddy 50 and pulls thereby sliding the bag caddy and the filter bag 20 connected thereto off of the bag mount 22. The operator then positions the caddy 50 over a garbage can and manipulates the bag ejector 76 in order to eject the filter bag 20 from the bag caddy. More specifically, the operator engages the actuator 86 by use of the fingers and slides the actuator in the direction of action arrows B from the bag latching position to the bag ejecting position (i.e. from the position illustrated in FIG. 5a, through the position illustrated in FIG. 5b to the position illustrated in FIG. 5c). Upon initial movement, the control tab 78 disengages the head 71 of the securing pin 66. As a result, the securing pin 66 is biased under the force of the spring 70 from the bag retaining position to the bag releasing position (i.e., the pin 66 is biased upwardly in FIGS. 5a and 5b so as to move out of the securing aperture 94). Simultaneously, the lugs 84, in engagement with the leading edge 100 of the bag collar 90 function to slide the bag collar and particularly the side margins 98 thereof, out from the channels 74.

Figure 2C:
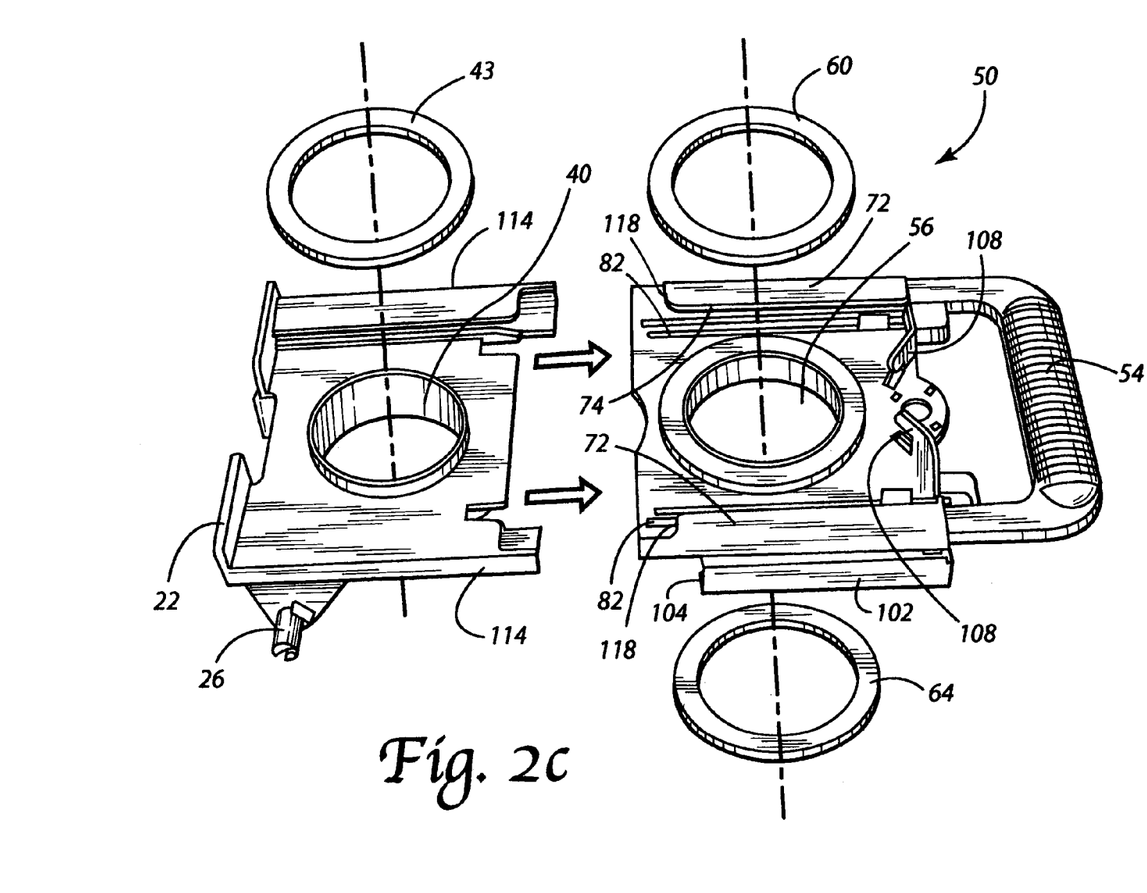
FIG. 2c is an exploded bottom perspective view of the bag mount and bag caddy.

As is apparent from viewing FIG. 2c, the guide slots 82 extend past the opened ends 118 of the channels 74. Accordingly, when the bag ejector 76 is fully displaced by the operator toward the bag ejecting position (see FIG. 5c), the side margins 98 of the bag collar 90 have been fully forced from the bag receiver channels 74 and, accordingly, the bag collar 90 and filter bag 20 are free to fall under the force of gravity from the bag caddy 50. A new bag 20 is then inserted on the bag caddy 50 in the manner previously described and is connected back to the bag mount 22. The access door 39 of the vacuum cleaner 10 is then closed and the vacuum cleaner is again ready for operation.

Figure 6:
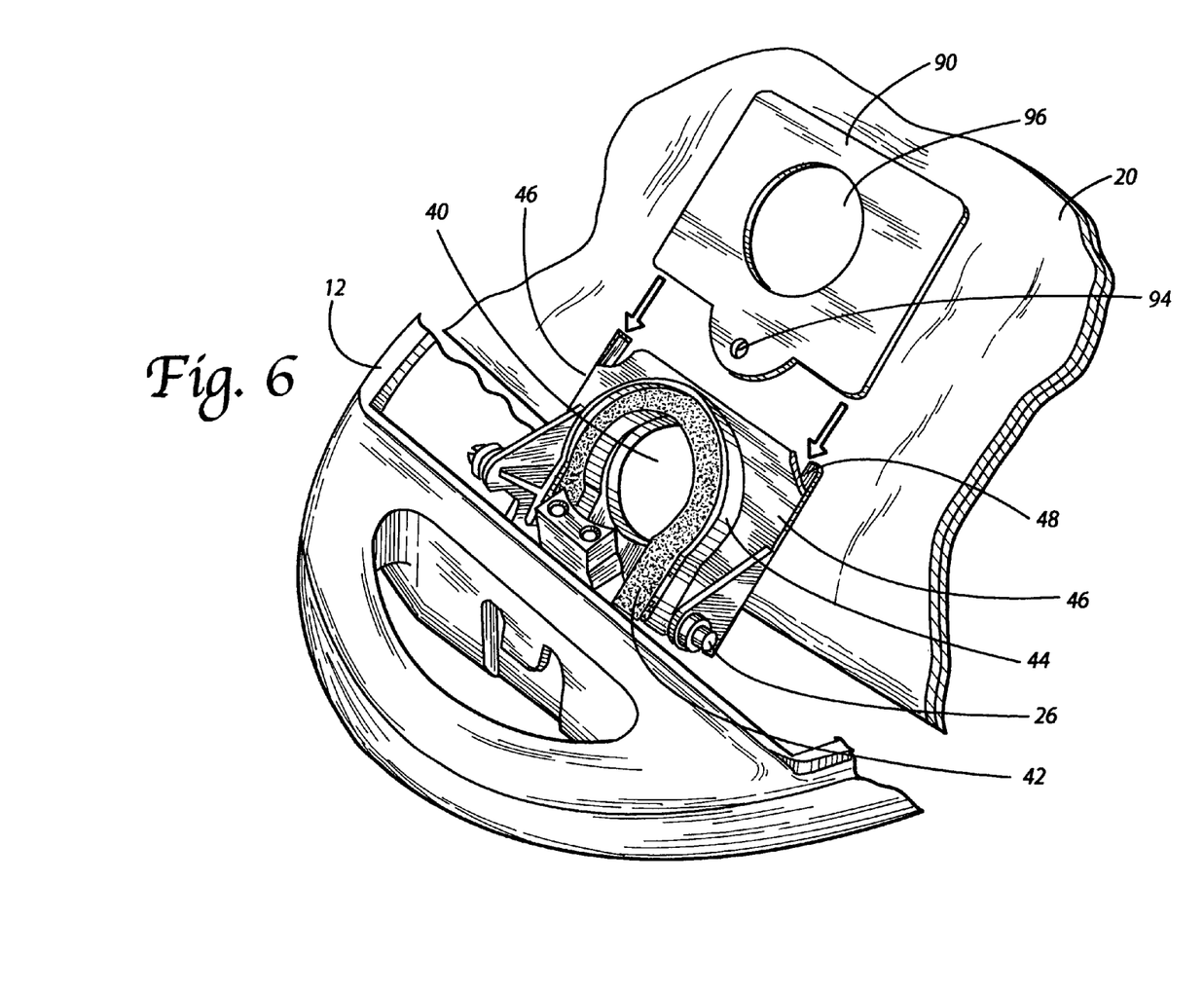
FIG. 6 is a perspective view illustrating how the collar of a bag may be secured directly to the bag mount in the absence of the bag caddy, if desired.

As best illustrated in FIG. 6, it should be appreciated that the vacuum cleaner 10 may also be operated without the bag caddy 50 in the event the bag caddy 50 should become lost or in the event the operator so desires. More specifically, in this situation, the bag collar 90 is aligned directly above the first face 112 of the bag mount 22. The operator then slides the bag collar 90 relative to the bag mount so that the leading edge 100 and particularly the side margins 98 of the collar are inserted in the channels 48 of the bag receiver 46.

In summary, numerous benefits result from employing the concepts of the present invention. Advantageously, through the use of the bag caddy 50 and particularly the handle 54 and the bag ejector 76, it is possible to remove a used filter bag 20 from a vacuum cleaner 10 without having to physically touch the filter bag. It is expected that many consumers will appreciate not having to directly handle the used filter bag. Additionally, it should be appreciated that the bag mount 22 is also made to directly accept a filter bag 20 if the operator so desires. Accordingly, the vacuum cleaner 10 provides unparalleled versatility in operation.

The foregoing description of the preferred embodiment of the invention has been presented for purposes of illustration and description. It is not intended to be exhaustive or to limit the invention to the precise form disclosed. Obvious modifications or variations are possible in light of the above teachings. For example, while the vacuum cleaner illustrated and described in this document is a canister vacuum cleaner, it should be appreciated that the vacuum cleaner may just as easily be a hand-held or an upright vacuum cleaner and the present invention and claims are considered to be broad enough to be drawn thereto.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiment do not and are not intended to limit the ordinary meaning of the claims and their fair and broad interpretation in any way.

The invention claimed is:

1. A vacuum cleaner, comprising:
   a housing;
   a suction generator carried by said housing;
   a bag mount carried by said housing; and
   a bag caddy displaceable between an operating position connected to said bag mount and a bag disposal position disconnected from said bag mount, said bag caddy including a first body and a bag retainer having a securing pin.

2. The vacuum cleaner of claim 1 wherein said bag mount is pivotally connected to said housing.

3. The vacuum cleaner of claim 1, wherein said bag mount includes a second body having a bag inlet.

4. The vacuum cleaner of claim 3, further including a first seal on said second body around said bag inlet.

5. The vacuum cleaner of claim 4, further including a reinforcing collar on said second body around at least a portion of said first seal.

6. The vacuum cleaner of claim 1, wherein said bag mount includes a bag receiver.

7. The vacuum cleaner of claim 6, wherein said bag receiver includes a pair of opposed bag collar receiving channels.

8. The vacuum cleaner of claim 1, wherein said bag caddy includes a handle.

9. The vacuum cleaner of claim 8, wherein said bag caddy includes a bag ejector.

10. The vacuum cleaner of claim 9, wherein said bag caddy includes a connector for securing said bag caddy on said bag mount.

11. The vacuum cleaner of claim 10, wherein said bag caddy includes a bag inlet.

12. The vacuum cleaner of claim 11, further including a first seal on a first face of said bag caddy around said inlet and a second seal on a second face of said bag caddy around said inlet.

13. The vacuum cleaner of claim 1, wherein said securing pin is displaceable between a bag retaining position and a bag releasing position.

14. The vacuum cleaner of claim 13, wherein said securing pin is held in a latch housing and a spring in said latch housing biases said pin into said releasing position.

15. The vacuum cleaner of claim 14, wherein said bag caddy includes a bag ejector.

16. The vacuum cleaner of claim 15, wherein said bag ejector slides relative to said first body between a bag latching position and a bag ejecting position.

17. The vacuum cleaner of claim 16, wherein said bag ejector includes at least one control tab, said control tab engaging said securing pin and displacing said securing pin into said bag retaining position against biasing of said spring when said bag ejector is in said bag latching position.

18. The vacuum cleaner of claim 1, wherein said bag caddy includes a bag ejector.

19. The vacuum cleaner of claim 18, wherein said bag ejector slides relative to said first body between a bag latching position and a bag ejecting position.

20. The vacuum cleaner of claim 19, wherein said first body includes a pair of guide slots and said bag ejector includes a pair of followers, one of said pair of followers being received in one of said pair of guide slots.

21. The vacuum cleaner of claim 20, wherein said bag ejector includes an actuator that extends between said pair of followers.

22. The vacuum cleaner of claim 21, wherein each one of said pair of followers includes a lug.

23. The vacuum cleaner of claim 22, further including a filter bag with a bag collar.

24. The vacuum cleaner of claim 23, wherein said first body includes a bag receiver.

25. The vacuum cleaner of claim 24, wherein said bag receiver includes a pair of opposed bag collar receiving channels.

26. The vacuum cleaner of claim 25, wherein each of said lugs engages said collar so that as said bag ejector is displaced from said bag latching position to said bag ejecting position, said bag is stripped from said bag caddy.

27. The vacuum cleaner of claim 1, wherein said bag caddy is optional and said bag may be attached directly to said bag mount.

28. A vacuum cleaner, comprising:
a housing;
a suction generator carried on said housing; and
a bag mount carried on said housing including both a bag receiver and a bag caddy receiver whereby said bag mount may receive and hold a filter bag alone or a filter bag carried on a bag caddy.

29. The vacuum cleaner of claim 28, further including (a) an optional bag caddy displaceable between a first position connected to said bag caddy receiver and a second position disconnected from said bag caddy receiver and (b) a filter bag, said filter bag being directly connectable to either said bag receiver on said bag mount or said bag caddy.

30. The vacuum cleaner of claim 29, wherein said bag receiver includes a pair of opposed channels.

31. The vacuum cleaner of claim 29, wherein said bag caddy receiver includes opposed margins of said bag mount.

32. A vacuum cleaner, comprising:
a housing;
a suction generator carried by said housing;
a bag mount carried by said housing; and
a bag caddy displaceable between an operating position connected to said bag mount and a bag disposal position disconnected from said bag mount, said bag caddy including a sliding bag ejector displaceable between a bag latching position and a bag ejecting position.

* * * * *